United States Patent [19]

Nishijima

[11] Patent Number: 5,206,898
[45] Date of Patent: Apr. 27, 1993

[54] TRANSMISSION CONTROL UNIT

[75] Inventor: Noriaki Nishijima, Kawanishishi, Japan

[73] Assignee: Shirohato Yakuhiin Co., Ltd., Osaka, Japan

[21] Appl. No.: 784,063

[22] Filed: Oct. 30, 1991

Related U.S. Application Data

[63] Continuation of Ser. No. 527,534, May 23, 1990, abandoned.

[30] Foreign Application Priority Data

May 26, 1989 [JP] Japan .............................. 1-61098[U]

[51] Int. Cl.⁵ .......................................... H04M 11/00
[52] U.S. Cl. ...................................... 379/90; 379/100; 379/442
[58] Field of Search ............................ 379/90, 93–95, 379/97, 98, 100, 442, 443, 99, 184

[56] References Cited

U.S. PATENT DOCUMENTS

| | | | |
|---|---|---|---|
| 3,647,972 | 3/1972 | Grover et al. | |
| 3,663,757 | 5/1972 | Cassidy | |
| 4,203,006 | 5/1980 | Mascia | |
| 4,288,661 | 9/1981 | Krishan | |
| 4,446,335 | 5/1984 | Lee et al. | 379/443 |
| 4,599,491 | 7/1986 | Serrano | |
| 4,805,210 | 2/1989 | Griffith, Jr. | 379/184 |
| 4,807,278 | 2/1989 | Ross | 379/184 |
| 4,809,317 | 2/1989 | Howe et al. | 379/184 |
| 4,815,121 | 3/1989 | Yoshida | 379/100 |
| 4,825,465 | 4/1989 | Ryan | 379/184 |
| 4,907,267 | 3/1990 | Gutzmer | 379/442 |
| 4,987,586 | 1/1991 | Gross et al. | 379/184 |
| 5,001,746 | 3/1991 | Nishijima | 379/443 X |

OTHER PUBLICATIONS

Telephony, Dec. 1986, p. 62 "Cellular Option".
Sidewell Development Ltd. "A-JEM Box Universal Interface Device" Jan. 88.
TVMP Inc. advertisement "PhoneFlex" Dec. 88.

*Primary Examiner*—James L. Dwyer
*Assistant Examiner*—Ahmad F. Matar
*Attorney, Agent, or Firm*—Ostrager, Chong & Flaherty

[57] ABSTRACT

A transmission control unit for controlling transmission and reception of data between electronic devices via a telephone without any use of acoustic coupling is disclosed. The transmission control unit is equipped with a first terminal for detachably connecting a main body of the telephone, a second terminal for detachably connecting a handset removable from the main body of the telephone, and a third terminal for detachably connecting the electronic device. When the main body, the handset and the electronic device are, respectively, connected to the first, second and third terminals, the transmission control unit permits analog electronic data from the electronic device to be input to the main body of the telephone at the handset interface level, and permits analog electronic data from the main body to be sent to the electonic device.

3 Claims, 4 Drawing Sheets

TRANSMISSION CONTROL UNIT

This application is continuation of application Ser. No. 07/527,534, filed May 23, 1990 now abandoned.

BACKGROUND OF THE INVENTION

Field of the Invention

The present invention relates to a transmission control unit for use in the transmission and reception of data between electronic devices such as a facsimile and a personal computer incorporating a modulator/-demodulator (MODEM) over a telephone.

There is a conventional technology of the transmission and reception of data between electronic devices via a telephone.

U.S. Pat. Nos. 4,599,491 issued Jul. 8, 1986 discloses a method and apparatus for converting direct coupled data devices to acoustic coupled devices. This apparatus consists of an acoustic coupler and associated electronics to provide acoustic coupling to a telephone handset and to connect to a direct connect modem or other data device to allow operation of the direct connect modem in most modes as if directly connected to a telephone line.

However, since this apparatus requires an acoustic coupling, the operation is required for securely coupling the acoustic coupler to the telephone handset during data transmission, and moreover acoustic noise is apt to get mixed into the acoustic data to and from the handset, which results in adversely affecting the accuracy of data communication.

SUMMARY OF THE INVENTION

An object of the present invention is to provide a transmission control unit which can perform the transmission and reception of data between electronic devices via a telephone with easy operation and high accuracy without the use of an acoustic coupling device.

A further object of the present invention is to provide a highly versatile, compact and simple transmission control unit capable of being used to connect an electronic device to any type of telephone (including an electronic push-button type) or any public telephone without the need of installing a particular interface circuit for each type of telephone.

In order to achieve the object, there is provided a transmission control unit for controlling the transmission and reception of data between electronic devices via a telephone without any use of acoustic coupling comprising:

a first terminal for detachably connecting a main body of said telephone:

a second terminal for detachably connecting a handset removable from said main body of said telephone:

a third terminal for detachably connecting said electronic device: and electronic means;

said third terminal being connected to said first and second terminals via said electronic means, said electronic means being constructed such that analog electronic data from said electronic device is input to said main body of the telephone at the handset signal level, and analog electronic data from said main body is sent to said electronic device at the handset signal level while preventing analog electronic data from said handset from being sent to said electronic device.

The transmission control unit according to the present invention may be provided with switching means for switching the first terminal to be connected to the second terminal, or to the third terminal via the electronic means.

DESCRIPTION OF THE PREFERRED EMBODIMENT

Figure 1:
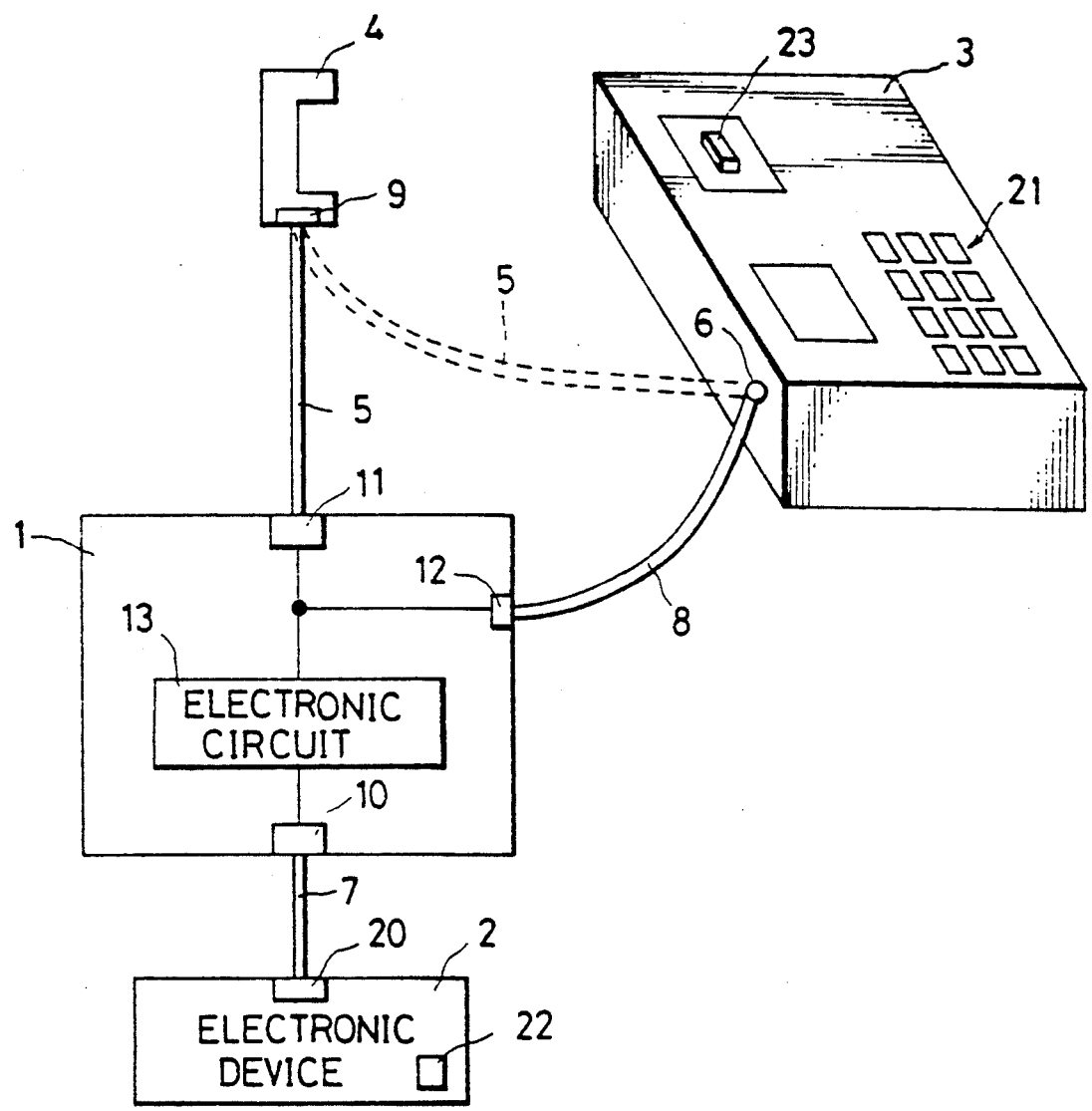
FIG. 1 is a structural view of a first embodiment of a transmission control unit according to the present invention.

FIG. 1 shows a first embodiment of a transmission control unit according to the present invention.

Referring to FIG. 1, a handset 4 is removable from a telephone main body 3. The telephone main body 3 and the handset 4 are, respectively, equipped with terminals 6, 9 between which a cable 5 is detachably connected. The transmission control unit 1 is adapted to transmit data from an electronic device 2 (such as a facsimile device or a personal computer with a MODEM) to a destination electronic device (not shown), and to transmit data from the destination electronic device to the electronic device 2 via the telephone main body 3 and a telephone line (not shown). In order to connect the transmission control unit 1 to the electronic device 2, the electronic device 2 is equipped with a terminal 20 to which a cable 7 can be connected.

Corresponding to the terminals 20, 9, 6, the transmission control unit 1 is equipped with terminals 10, 11 and 12 to which cable 7, 5, 8 are detachably connected, respectively. In the first embodiment of the present invention, the terminals 11 and 12 of the transmission control unit 1 are always connected, and the terminal 10 is connected to the terminals 11 and 12 by way of an electronic circuit 13, as shown in FIG. 1. The electronic device 2 and the transmission control unit 1 employ an analog interface. Thus, analog electronic data from the electronic device 2 is input to the transmission control unit 1 and vice versa. Similarly, the transmission control unit 1 and the telephone main body 3 employ the analog interface at the handset signal level.

The electronic circuit 13 is constructed such that analog electronic data from the electronic device 2 via the terminal 10 is transmitted through a transformer to be input to the telephone main body 3 via the terminals 12 and 6, and conversely, analog electronic data sent from the telephone main body 3 via the terminal 12 is transmitted through a transformer to be sent to the electronic device 2 via the terminal 10 while preventing analog electronic data from the handset 4 from being sent to the electronic device 2.

Figure 2:
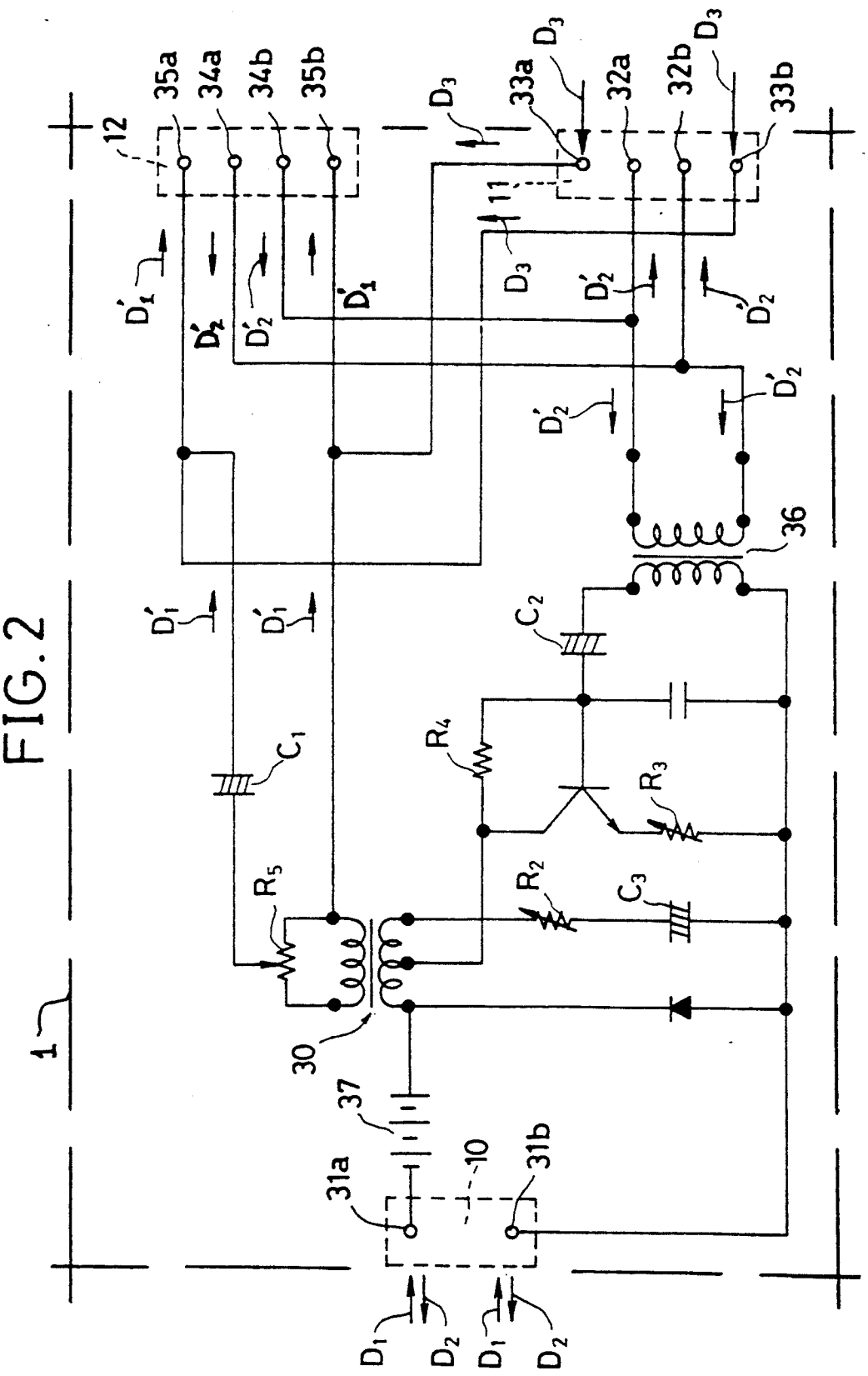
FIG. 2 is a view of a specific example of the transmission control unit shown in FIG. 1.

A specific example of the transmission control unit 1 is given in FIG. 2. In this example, a transformer 30 (type ST-71 transformer, for example) is used in the electronic circuit 13. The terminal 10 has two pins 31a and 31b for receiving analog electronic data D₁ from the electronic device 2 and for transmitting analog electronic data $D_2$ obtained via the transformer 30 from analog electronic data $D_2'$ sent from the telephone main body 3. The terminal 11 has two pins 32a and 32b for receiving analog electronic data $D_2'$ sent from the telephone main body 3 and also has two pins 33a and 33b for receiving analog electronic data $D_3$ from the handset 4. The terminal 12 has two pins 34a and 34b for receiving analog electronic data $D_2'$ from the telephone main body 3 and also has two pins 35a and 35b for receiving analog electronic data $D_1'$ to which analog electronic data $D_1$ from the electronic device 2 is transmitted in the electronic circuit 13 or for receiving analog electronic data $D_3$ from the handset 4.

In FIG. 2, a type ST-71 transformer, for example, can be employed as a transformer 36, like the case of the transformer 30. DC-component cutting capacitors $C_1$ and $C_2$ are, for example, 10 $\mu F$ and 1 $\mu F$, respectively, and a capacitor $C_3$, for example, is 47 $\mu F$. Resistors $R_2$, $R_3$ and $R_4$ are, for example, 1 k ohm, 100 ohms and 100 k ohms, respectively. A variable resistor $R_5$ is used to match the analog electronic data level with that of the telephone main body 3. As shown in FIG. 2, a current-adjusting power source 37 is provided between the pin 31a and the transformer 30. The current adjusting power source 37 obtains a suitable current adjustment so that the electronic circuit can be connected to any type of electronic device, for example, as explained in more detail in the related, copending, commonly-owned U.S. Pat. No. 5,001,746 by the same inventor, entitled "Transmission Control Unit". This power source 37 may be omitted if a similar current-adjusting power source is provided into the electronic device 30 (a facsimile device, for example).

The use and operation of the transmission control unit 1 will be described.

In ordinary telephone operation (i.e. the transmission control unit 1 is not used), the cable 5 from the handset 4 is directly connected to the terminal 6 of the telephone main body 3, as indicated by the broken line in FIG. 1. When a transmission and reception operation is to be performed between the electronic device 2 and the destination electronic device, the cable 5 is removed from the terminal 6 of the telephone main body 3 and then connected to the terminal 11 of the transmission control unit 1. Also, the cable 8 is connected between the terminal 6 of the telephone main body 3 and the terminal 12 of the transmission control unit 1. Finally, the cable 7 is connected between the terminal 20 of the electronic device 2 and the terminal 10 of the transmission control unit 1.

When data from the electronic device 2 is to be transmitted to the destination electronic device via the telephone line, the handset 4 is picked up which causes the hook switch 23 to be in the OFF hook state, and then the dial 21 of the telephone main body 3 is operated to make a call connection with the destination telephone, and finally the transmit button 22 of the electronic device 2 is pushed to send analog electronic data $D_1$ to the transmission control unit 1. In the transmission control unit 1, analog electronic data $D_1$ sent from the electronic device 2 is transmitted in the electronic circuit 13 to obtain analog electronic data $D_1'$ at the handset signal level. The analog electronic data $D_1'$ from the electronic circuit 13 is then sent via the terminal 12, the cable 8 and the terminal 6 to the telephone main body 3 without any use of the acoustic coupling. Thus, data $D_1$ from the electronic device 2 can be transmitted through the telephone line to the destination electronic device.

On the other hand, when data from the destination electronic device is received by the telephone main body 3, this data is sent as analog electronic data $D_2'$ to the transmission control unit 1 via the terminal 6, the cable 8 and the terminal 12 without any use of the acoustic coupling. This data $D_2'$ is transmitted in the electronic circuit 13 to obtain analog electronic data $D_2$ which is sent via the terminal 10, the cable 7 and the terminal 20 to the electronic device 2. This completes the data reception at the electronic device 2.

In order to perform the above-mentioned data transmission and reception operation between the electronic device 2 and the destination electronic device by using the transmission control unit 1, there is no direct connection through the cable 5 (broken lines) between the telephone main body 3 and the handset 4. However, the terminals 11 and 12 are always connected in the transmission control unit 1, and thus the telephone main body 3 and the handset 4 are connected via the cable 8, the terminals 11 and 12 and the cable 5. For this reason, ordinary telephone conversations are allowed in the configuration for the data transmission and reception operation between the electronic device 2 and the destination electronic device without any cable connection change.

As shown in FIG. 2, a signal, caused by the voice of a caller at the handset 4, is input to the terminal 11 as analog electronic data $D_3$ which is then applied to the telephone main body 3 via the terminal 12. A signal caused by the voice at the destination telephone is input from the telephone main body 3 to the terminal 12 as analog electronic data $D_2'$ which is sent via the terminal 11 to the handset 4. Therefore, ordinary telephone conversation functions can be maintained.

As described above, since the transmission control unit 1 enables the telephone main body 3 and the electronic device 2 to be electrically connected by use of the cables 7, 8 without any use of the acoustic coupling, data communication between electronic devices can be performed with easy operation and high accuracy, compared to the conventional apparatus. And since the interface between the electronic device 2 and the telephone main body 3 is performed at the handset interface level, this transmission control unit 1 has a high degree of versatility, that is, interface matching between the electronic device 2 and the telephone main body 3 can be readily made without the need of installing a particular interface for the telephone and without interrupting ordinary telephone conversation functions, regardless of the type of telephone employed.

Especially worthy of note is the capability to connect an electronic device 2 to a push-button telephone without any modification or addition (a capability not available hitherto). Furthermore, the transmission control unit 1 itself can be made simple in construction, allowing it to be made compact and hence portable. Thus, if this transmission control unit 1 is introduced into the office, the electronic device 2 can be readily connected to any type of telephone used in the office without sacrificing whatever functions each telephone offers. As an example, if a certain telephone is in use and thus not available for data communication, then connection change to any unused telephone can be made to perform data communication without any difficulty.

However, in the transmission control unit 1 described above, since the terminals 11 and 12 are always connected, a data transmission and reception operation between an electronic device and a destination electronic device will cause data transfer-induced noise to be output from a speaker of the handset 4. This noise will get mixed in the microphone of the handset 4, thus adversely affecting the accuracy of data communication between electronic devices. Because of this noise problem, it is preferable that the handset 4 be separated from the electronic device 2 and the telephone main body 3 during data communication between an electronic device 2 and a destination electronic device.

Figure 3:
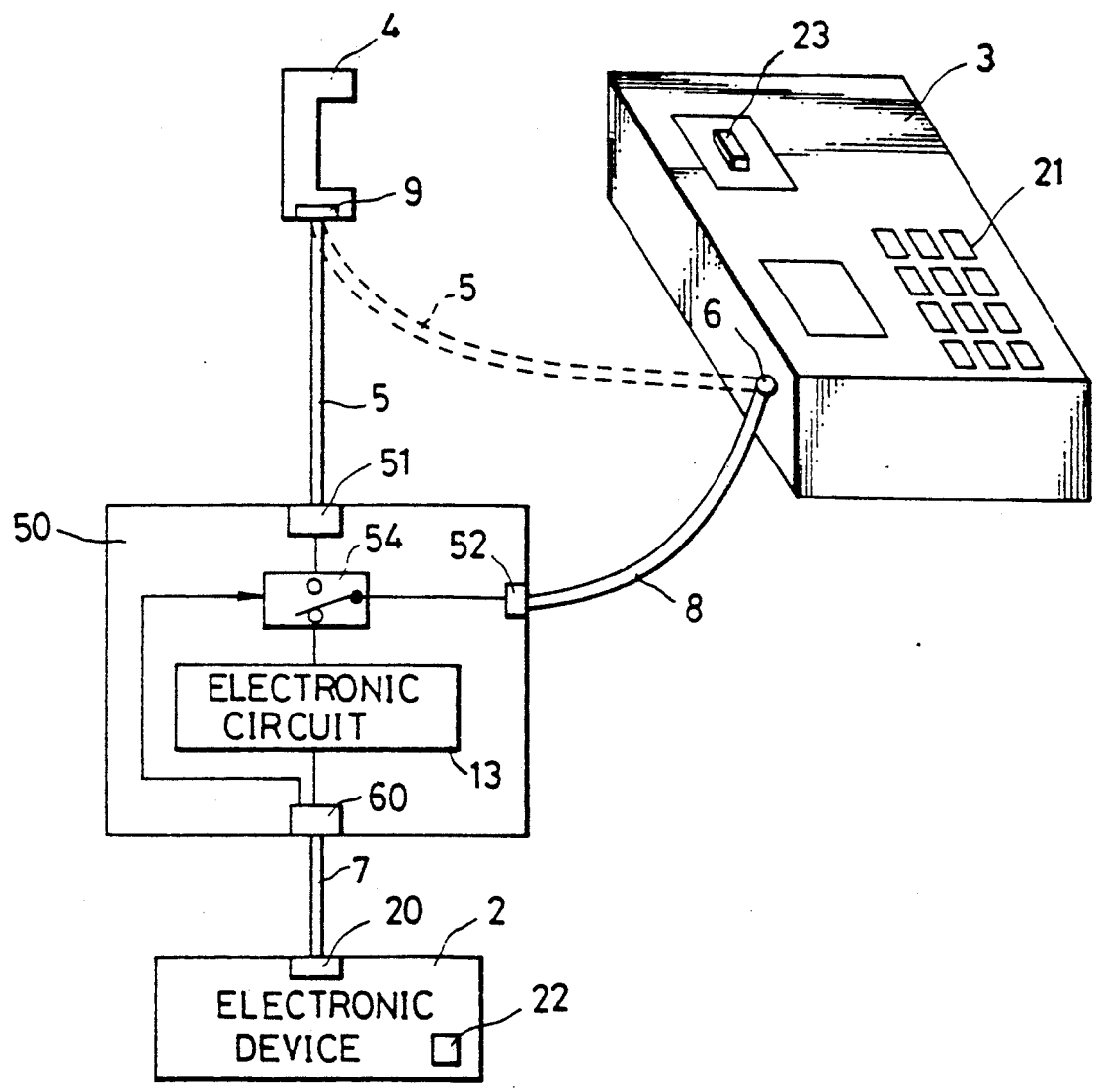
FIG. 3 is a structural view of a second embodiment of a transmission control unit according to the present invention.

FIG. 3 shows a second embodiment of a transmission control unit according to the present invention. In the transmission control unit 50 of FIG. 3, the noise problem associated with the first embodiment has been solved. Referring to FIG. 3, the transmission control unit 50 is provided with a switching unit 54 by which the terminal 52 can be connected to the terminal 51, or to the electronic circuit 13 (that is, the side of the electronic device 2).

The switching unit 54 is in the state of connecting the terminal 52 to the terminal 51 when the electronic device 2 does not transmit and/or receive data. But when the electronic device 2 transmits and/or receives data, the switching unit 54 functions to connect the terminal 52 to the electronic circuit 13 in response to the command sent via the cable 7 and the terminal 60 from the electronic device 2.

Figure 4:
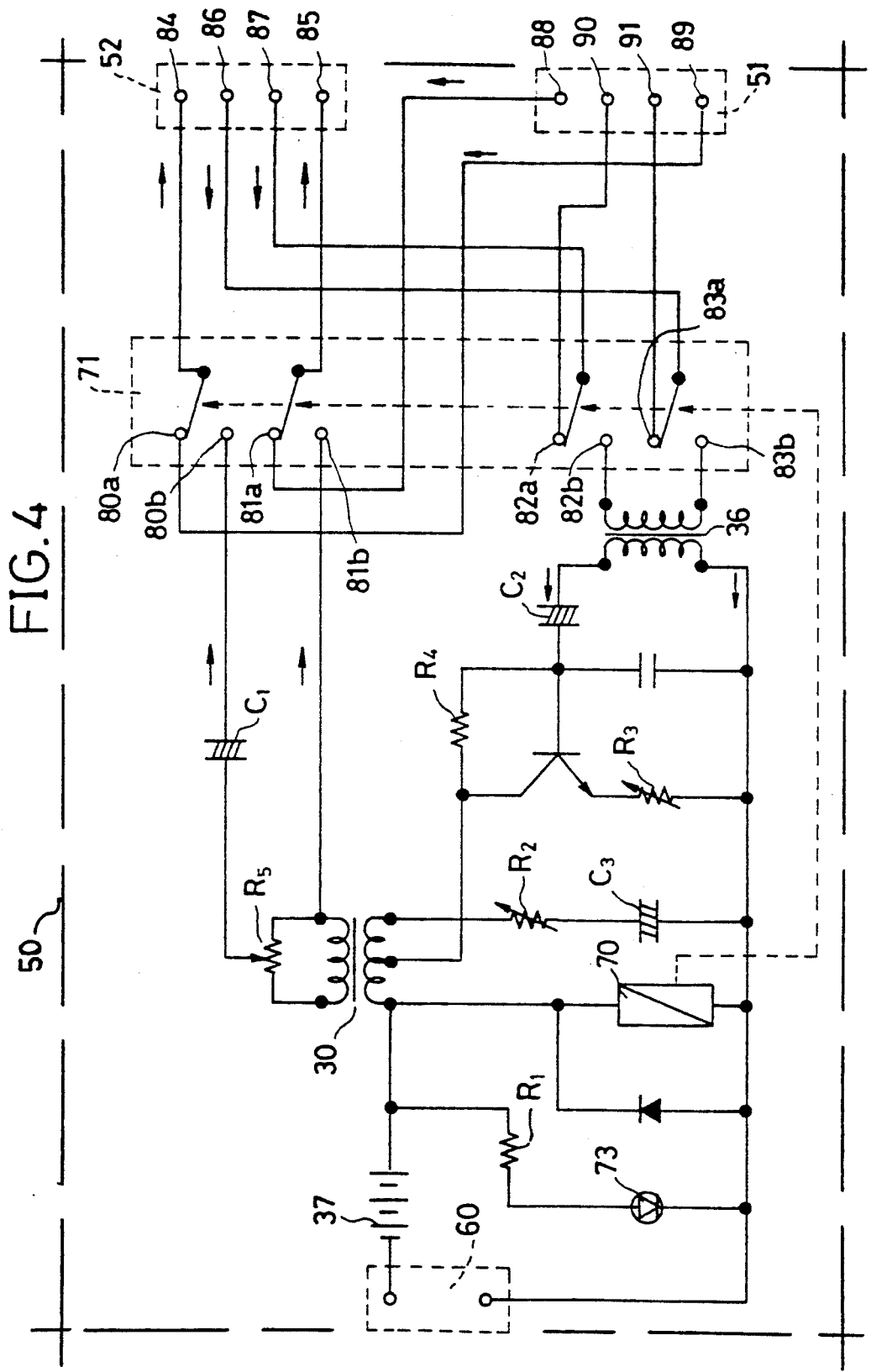
FIG. 4 is a view of a specific example of the transmission control unit shown in FIG. 3.

FIG. 4 shows a specific example of the transmission control unit 50.

Referring to FIG. 4, the switching unit 54 includes a relay 70 and a switch group 71 which is governed by the operation of the relay 70. A light-emitting diode (LED) 73 is connected in series with resistor R1 (1 k ohm, approx.) to provide ON/OFF indication of the relay 70.

When a data transmission and reception operation between an electronic device 2 and a destination electronic device is not being performed, the relay 70 is inactive and the switch group 71 is in the state of connecting pins 84 through 87 of the terminal 52 to pins 88 through 91 of the terminal 51 via pins 80a through 83a, respectively, as indicated in FIG. 4. By these connections, the transmission control unit 50 functions to make only the handset 4 connect to the telephone main body 3 for ordinary telephone functions. The LED 73 remains in the OFF state.

In the state mentioned above, if data from the electronic device 2 (a facsimile device, for instance) is to be transmitted to a destination electronic device, the handset 4 is picked up and then the dial 21 of the telephone main body 3 is operated to make a call connection with the destination electronic device. After confirming the signaling tone (sounds like "beep") from the handset 4, the transmit button 22 is pushed to generate the transmit command which is applied through the cable 7 to the terminal 60 of the transmission control unit 50. This causes the relay 70 in the transmission control unit 50 to operate, making pins 84 through 87 of the terminal 52 connect to pins 80b through 83b, respectively. By these connections, the transmission control unit 50 functions to make only the electronic device 2 connect to the telephone main body 3 via the electronic circuit 13. The handset 4 is separated from the telephone main body 3 and the electronic device 2. When this state is reached by the operation of the relay 70, then the LED 73 will go ON.

As described above, the transmission control unit 50 has the capability of automatic internal switching between ordinary telephone functions and transmission/reception function of the electronic device 2 without the need of connection changes of the cables 5, 8 and 7, etc. Since the handset 4 is in a separated state when switched to the transmission/reception function of the electronic device 2, the noise problem (noise generation from the speaker and noise mixed into the microphone) encountered in the first embodiment does not exist.

Thus, through the use of the switching unit 54, the noise problem can be solved, and data communication between electronic devices can be performed with easy operation and high accuracy, compared to the conventional apparatus.

Transmission control units 50 described above is considerably simple in construction, allowing it to be made compact and hence portable.

Although the transformer 30 is employed in the electronic circuit 13 of both control unit 1, 50, it can be replaced by a speech amplifier or a resistor bridge.

What is claimed is:

1. A transmission control unit, for controlling the transmission and reception of analog electronic data between an electronic device and a main telephone unit having an electronically detachable handset without any use of acoustic coupling, comprising:

a first terminal for detachably connecting the transmission control unit electronically to the main telephone unit;

a second terminal for detachably connecting the transmission control unit electronically to the handset when the handset is electronically detached from the main telephone unit;

a third terminal for detachably connecting the transmission control unit electronically to the electronic device; and an electronic circuit interconnecting said first, second, and third terminals and having switching means for connecting the first terminal only to the third terminal when analog electronic data is to be transmitted from the electronic device to the main telephone unit, and connecting the first terminal only to the second terminal when analog electronic data is not to be transmitted from the electronic device to the main telephone unit, said switching means being electronically responsive to a switching signal received from the electronic device through said third terminal for connecting said first terminal to said third terminal when analog electronic data is to be transmitted from the electronic device to the main telephone unit, wherein the electronic device has a transmit button which is pushed to generate a transmit command in order to effect transmission of analog electronic data from the electronic device to the main telephone unit, wherein said switching means includes a relay coupled to a switch group which is normally in an OFF position connecting said first terminal to said second terminal and which is responsive to the transmit command for effecting transmission from the electronic device through said third terminal for switching to an ON position disconnecting said first terminal from said second terminal and connecting said first terminal only to said third terminal when analog electronic data is to be transmitted from the electronic device to the main telephone unit, and further, wherein said electronic circuit includes a current-adjusting power source coupled between said third terminal and said switching means for adjusting a suitable loop current of the electronic device provided to said third terminal, so that said transmission control unit can be connected to any type of electronic device without requiring a matching modification thereof.

2. A transmission control unit according to claim 1, wherein the electronic device is a computer with a modem, and said switching means is responsive to a switching signal provided therefrom.

3. A transmission control unit according to claim 1, wherein the electronic device is a facsimile machine, and said switching means is responsive to a switching signal provided therefrom.

* * * * *